US012668709B2

(12) United States Patent
Yohda et al.

(10) Patent No.: US 12,668,709 B2
(45) Date of Patent: Jun. 30, 2026

(54) PHOTOCURABLE COMPOSITION, INKJET INK COMPOSITION, ACTIVE ENERGY RAY-CURABLE INK COMPOSITION, CURED PRODUCT, AND ELECTRONIC COMPONENT

(71) Applicant: JNC CORPORATION, Tokyo (JP)

(72) Inventors: Masaaki Yohda, Chiba (JP); Takayuki Hirota, Chiba (JP); Kohsuke Yoshitomi, Chiba (JP); Katsuyuki Sugihara, Chiba (JP); Hisao Oikawa, Chiba (JP)

(73) Assignee: JNC CORPORATION, Tokyo (JP)

( * ) Notice: Subject to any disclaimer, the term of this patent is extended or adjusted under 35 U.S.C. 154(b) by 820 days.

(21) Appl. No.: 17/917,240

(22) PCT Filed: Jun. 17, 2021

(86) PCT No.: PCT/JP2021/023008
§ 371 (c)(1),
(2) Date: Oct. 6, 2022

(87) PCT Pub. No.: WO2022/009640
PCT Pub. Date: Jan. 13, 2022

(65) Prior Publication Data

US 2023/0151237 A1 May 18, 2023

(30) Foreign Application Priority Data

Jul. 8, 2020 (JP) ................................ 2020-117907

(51) Int. Cl.

| | |
|---|---|
| ***C09D 11/38*** | (2014.01) |
| ***C09D 11/037*** | (2014.01) |
| ***C09D 11/101*** | (2014.01) |
| ***C09D 11/107*** | (2014.01) |
| ***C09D 11/322*** | (2014.01) |

(52) U.S. Cl.
CPC ............ *C09D 11/38* (2013.01); *C09D 11/037* (2013.01); *C09D 11/101* (2013.01); *C09D 11/107* (2013.01); *C09D 11/322* (2013.01)

(58) Field of Classification Search
None
See application file for complete search history.

(56) References Cited

U.S. PATENT DOCUMENTS

| | | | | |
|---|---|---|---|---|
| 4,004,997 | A * | 1/1977 | Tsukamoto | C08F 8/00 528/56 |
| 7,670,752 | B2 * | 3/2010 | Hirakawa | G03F 7/027 430/910 |
| 10,947,326 | B2 * | 3/2021 | Katou | G02B 13/0085 |
| 2008/0063816 | A1 * | 3/2008 | Imalzumi | G02F 1/1339 524/413 |
| 2010/0178501 | A1 * | 7/2010 | Masuko | C09J 4/06 522/75 |
| 2012/0210908 | A1 * | 8/2012 | Endo | C09D 11/36 106/31.78 |
| 2023/0151237 | A1 * | 5/2023 | Yohda | C08F 220/10 522/39 |
| 2025/0011610 | A1 * | 1/2025 | Katsuda | C09D 11/322 |

FOREIGN PATENT DOCUMENTS

| | | | | |
|---|---|---|---|---|
| CN | 102181019 A * | 9/2011 | | |
| EP | 4023441 A1 * | 7/2022 | C09D 11/101 |
| JP | H05327191 | 12/1993 | |
| JP | 2002302536 | 10/2002 | |
| JP | 2003238770 | 8/2003 | |
| JP | 2005317523 | 11/2005 | |
| JP | 2011032405 A * | 2/2011 | |
| JP | 5712677 B2 * | 5/2015 | |
| WO | 2013015125 | 1/2013 | |
| WO | WO-2021200258 A1 * | 10/2021 | B41M 5/00 |

OTHER PUBLICATIONS

"International Search Report (Form PCT/ISA/210) of PCT/JP2021/023008," mailed on Aug. 24, 2021, with English translation thereof, pp. 1-6.

* cited by examiner

*Primary Examiner* — Sanza L. McClendon
(74) *Attorney, Agent, or Firm* — JCIPRNET

(57) ABSTRACT

A photocurable composition is capable of forming a cured product that has good reliability in a high-temperature constant-humidity environment, especially good ion migration resistance in a temperature range of 100° C. or higher. The photocurable composition (Z) is obtained by adding an ion scavenger (Y) to a composition (X) containing a monofunctional acrylic monomer (A) and a multifunctional acrylic monomer (B), wherein the content of the monofunctional acrylic monomer (A) relative to 100 wt % of the composition (X) is from 40 wt % to 80 wt %, and the content of the multifunctional acrylic monomer (B) relative to 100 wt % of the composition (X) is from 10 wt % to 50 wt %. An inkjet ink composition contains the photocurable composition (Z); a cured product; and an electronic component.

24 Claims, No Drawings

PHOTOCURABLE COMPOSITION, INKJET INK COMPOSITION, ACTIVE ENERGY RAY-CURABLE INK COMPOSITION, CURED PRODUCT, AND ELECTRONIC COMPONENT

CROSS-REFERENCE TO RELATED APPLICATION

This application is a 371 application of the International PCT application serial no. PCT/JP2021/023008, filed on Jun. 17, 2021, which claims priority benefits of Japanese Patent Application No. 2020-117907, filed on Jul. 8, 2020. The entirety of each of the above-mentioned patent applications is hereby incorporated by reference herein and made a part of this specification.

FIELD OF THE INVENTION

This invention relates to a photocurable composition that can be suitably used to manufacture, for example, display elements or electronic circuit boards such as a printed wiring board, a flexible wiring board, a semiconductor package substrate and a solar cell substrate.

BACKGROUND ART

Recently, a variety of studies have been underway regarding coating agents intended to protect base materials such as a variety of resin plates, glass plates and metal plates that are used as building materials or in the electric and electronic fields, which have a coating formed on the surface, from scratches, contamination and the like. Thermosetting resins or photocurable resins are being used as coating agents, and, in a case where a photocurable resin is used, a cured product having high surface hardness can be obtained often, and the photocurable resin is instantly cured by light irradiation and has high productivity. Therefore, photocurable resins are frequently used to protect the surfaces of organic base materials. However, ordinarily, the adhesion of cured products for which a photocurable resin has been used is not sufficient in many cases with respect to inorganic base materials. Hence, a variety of studies are ongoing to improve the adhesion to inorganic base materials.

For example, Patent Literature 1 describes a photocurable inkjet ink in which a specific monofunctional polymerizable monomer component (A), a multifunctional polymerizable monomer (B) and a polymerization initiator (C) are each contained in a predetermined amount. The use of the photocurable inkjet ink makes it possible to form cured products that have good adhesion to inorganic base materials.

CITATION LIST

Patent Literature

Patent Literature 1: International Publication WO 2013/015125

SUMMARY OF INVENTION

Technical Problem

However, due to the thickness reduction and size reduction of electronic components, there have been cases where some cured films for which the photocurable inkjet ink described in Patent Literature 1 has been used do not have sufficient adhesion. For example, it was found that, in a case where reliability in a temperature range of 100° C. or higher is required as in in-vehicle devices, a problem is created due to ion migration. Here, ion migration refers to a phenomenon in which metal used for a wire or an electrode ionizes, migrates and grows and becomes a cause for the short circuit of electronic components. Therefore, it is important to prevent ion migration from the viewpoint of the reliability of electronic components.

An object of this invention is to provide a photocurable composition capable of forming a cured product having good reliability in a high-temperature constant-humidity environment, especially good ion migration resistance in a temperature range of 100° C. or higher.

Solution to Problem

As a result of studies for solving the above-described problems, the present inventors found that a combination of specific components leads to a composition which is capable of forming cured products that have good adhesion to inorganic base materials and have good ion migration resistance. This invention is based on the above-described finding and includes the following configurations.

[1] A photocurable composition (Z) which is obtained by adding an ion scavenger (Y) to a composition (X) that contains a monofunctional acrylic monomer (A) and a multifunctional acrylic monomer (B), wherein a content of the monofunctional acrylic monomer (A) relative to 100 wt % of the composition (X) is from 40 wt % to 80 wt %, and a content of the multifunctional acrylic monomer (B) relative to 100 wt % of the composition (X) is from 10 wt % to 50 wt %.

[2] The photocurable composition (Z) according to [1], in which an addition amount of the ion scavenger (Y) relative to 100 parts by weight of the composition (X) is from 0.1 part by weight to 10 parts by weight.

[3] The photocurable composition (Z) according to [1] or [2], in which the ion scavenger (Y) is inorganic particles.

[4] The photocurable composition (Z) according to any one of [1] to [3], in which the ion scavenger (Y) is inorganic particles that contain any of a zirconium compound, a magnesium compound and an aluminum compound.

[5] The photocurable composition (Z) according to any one of [1] to [4], in which the ion scavenger (Y) is a mixture of a zirconium compound, a magnesium compound and an aluminum compound.

[6] The photocurable composition (Z) according to [1] or [2], in which the composition (X) has a hydroxyl value of 1 mgKOH/g to 100 mgKOH/g.

[7] The photocurable composition (Z) according to any one of [1] to [6], further containing a radical polymerizable compound (C) that has a hydroxyl value of 100 mgKOH/g to 300 mgKOH/g in the composition (X).

[8] The photocurable composition (Z) according to [7], in which the radical polymerizable compound (C) has a weight average molecular weight of 100 to 5000.

[9] The photocurable composition (Z) according to [7] or [8], in which a content of the radical polymerizable compound (C) relative to 100 wt % of the composition (X) is from 0.1 wt % to 30 wt %.

[10] The photocurable composition (Z) according to any one of [7] to [9], in which the radical polymerizable compound (C) has a hydroxyl value of 150 to 200 mgKOH/g.

[11] The photocurable composition (Z) according to any one of [7] to [10], in which the radical polymerizable compound (C) contains an acrylic oligomer.

[12] The photocurable composition (Z) according to any one of [1] to [11], in which the monofunctional acrylic monomer (A) contains a (meth)acrylate that has one or a plurality of groups out of the group consisting of a fused-ring hydrocarbon group, a polycyclic hydrocarbon group and a monocyclic hydrocarbon group.

[13] The photocurable composition (Z) according to [12], in which the monofunctional acrylic monomer (A) is represented by the following formula (1).

(1)

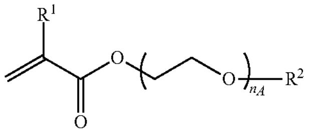

In formula (1), $R^1$ is hydrogen or methyl, $R^2$ is a monovalent organic group of 4 to 30 carbon atoms having a fused-ring hydrocarbon group, a polycyclic hydrocarbon group or a monocyclic hydrocarbon group, and $n_A$ is an integer of 0 to 10.

[14] The photocurable composition (Z) according to [13], in which $R^1$ in formula (1) is a group represented by any one of the following formulae (2) to (5).

(2)

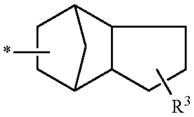

(3)

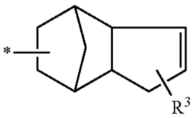

(4)

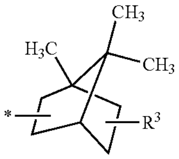

(5)

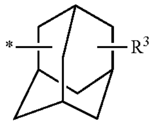

In formulae (2) to (5), each $R^3$ is independently hydrogen or an alkyl having 1 to 6 carbon atoms, and * is a bonding site.

[15] The photocurable composition (Z) according to any one of [1] to [14], in which the multifunctional acrylic monomer (B) is a difunctional acrylic monomer represented by the following formula (6).

(6)

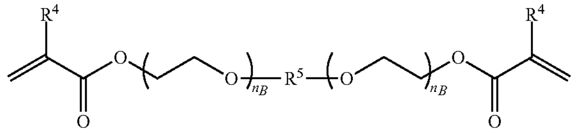

In formula (6), each $R^4$ is independently hydrogen or methyl, $R^5$ is a divalent organic group of 4 to 30 carbon atoms having a fused-ring hydrocarbon group, a polycyclic hydrocarbon group or a monocyclic hydrocarbon group, and each np is independently an integer of 0 to 10.

[16] The photocurable composition (Z) according to [15], in which $R^5$ in formula (6) is a group represented by any one of the following formulae (7) to (10).

(7)

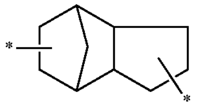

(8)

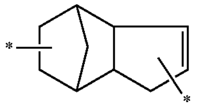

(9)

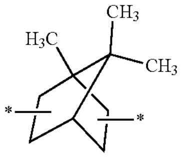

(10)

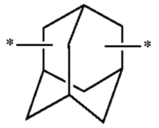

In formulae (7) to (10), * is a bonding site.

[17] The photocurable composition (Z) according to any one of [1] to [16], further containing from 5 wt % to 15 wt % of a photopolymerization initiator (D) in 100 wt % of the composition (X).

[18] The photocurable composition (Z) according to any one of [1] to [17], of which a viscosity at 25° C. is 1 to 100 mPa·s.

[19] The photocurable composition (Z) according to any one of [1] to [18], in which the composition (X) has a hydroxyl value of 5 mgKOH/g to 40 mgKOH/g.

[20] An inkjet ink composition, comprising the photocurable composition (Z) according to any one of [1] to [19].

[21] An active energy ray-curable ink composition, comprising the inkjet ink composition according to [20].

[22] A cured product, which is obtained by photocuring the photocurable composition (Z) according to any one of [1] to [19], the inkjet ink composition according to [20], or the active energy ray-curable ink composition according to [21].

[23] A cured product, which is obtained by photocuring and then thermocuring the photocurable composition (Z) according to any one of [1] to [19], the inkjet ink composition according to [20], or the active energy ray-curable ink composition according to [21].

[24] An electronic component, comprising the cured product according to [22] or [23].

Advantageous Effects of Invention

A photocurable composition (Z) of this invention is a photocurable composition (Z) which is obtained by adding an ion scavenger (Y) to a composition (X) that contains a monofunctional acrylic monomer (A) and a multifunctional acrylic monomer (B). The addition of the ion scavenger (Y) suppresses the generation of cations and anions, which become a cause of ion migration, and makes it possible to fundamentally solve a problem of ion migration. Furthermore, the adjustment of the hydroxyl value of the composition (X) makes it possible to improve the ion migration resistance and adhesion to a variety of substrates of cured products themselves obtained by curing the composition.

DESCRIPTION OF EMBODIMENTS

First, a photocurable composition (X) (hereinafter, also referred to as "composition (X)") will be described. The composition (X) is a composition that contains a monofunctional acrylic monomer (A) (hereinafter, also referred to as "component (A)" or simply "(A)") and a multifunctional acrylic monomer (B) (hereinafter, also referred to as "component (B)" or simply "(B)"). The components (A) and (B) are compounds that have a hydroxyl value of less than 100 mgKOH/g.

The content of the component (A) in the composition (X) relative to 100 wt % of the composition (X) is from 40 wt % to 80 wt %, and the content of the component (B) relative to 100 wt % of the composition (X) is from 10 wt % to 50 wt %.

The component (A) and the component (B) in the composition (X) contribute to improvement in ejectability and photocurability in the case of being used as an inkjet ink and contribute to improvement in heat resistance and adhesion to substrates, particularly, silicon substrates, glass substrates and substrates having a conductor, such as a metal wire or an electrode, formed on a silicon substrate or a glass substrate.

Further, the hydroxyl value of the composition (X) is preferably adjusted to 1 to 100 mgKOH/g. This makes it possible to improve the ion migration resistance and adhesion to a variety of substrates of a cured product obtained by curing the composition (X) itself. From the viewpoint of producing a cured product that has excellent ion migration resistance, the hydroxyl value of the composition (X) itself is more preferably 2 to 40 mgKOH/g, and still more preferably 5 to 40 mgKOH/g.

In order to adjust the hydroxyl value of the composition (X) to within a range of 1 to 100 mgKOH/g, for example, a component having a hydroxyl value of 1 mgKOH/g or more may be used as either or both of the component (A) and the component (B). Alternatively, a radical polymerizable compound (C) (also called "component (C)" or simply "(C)" hereafter) having a hydroxyl value of 100 to 300 mgKOH/g may be used as a hydroxyl value-adjusting agent.

In a case where the component (C) is used in the composition (X), a part or all of the component (A) may be the component (C), a part or all of the component (B) may be the component (C) or the component (C) that is a radical polymerizable compound other than the component (A) and the component (B) may be contained.

[Monofunctional Acrylic Monomer (A)]

The composition (X) contains the monofunctional acrylic monomer (A). The component (A) improves ejectability in the case of using the photocurable composition (Z) as an ink. The component (A) is also a component having excellent photocurability and is suitable for forming cured products that have excellent heat resistance and excellent adhesion to substrates in a balanced manner. From these viewpoints, the content of the component (A) relative to 100 wt % of the composition (X) is preferably from 40 wt % to 80 wt % and more preferably from 50 wt % to 75 wt %.

From the viewpoint of improving heat resistance and adhesion to substrates, particularly, glass substrates, silicon substrates and substrates having a conductor, such as a metal wire or an electrode, formed on a glass substrate or a silicon substrate, the component (A) preferably contains a (meth) acrylate having one or a plurality of groups out of the group consisting of a fused-ring hydrocarbon group, a polycyclic hydrocarbon group and a monocyclic hydrocarbon group. In the following description, a monofunctional acrylic monomer having a fused-ring hydrocarbon group or a polycyclic hydrocarbon group will be exemplified as (a-1), and a monofunctional polymerizable monomer having a monocyclic hydrocarbon group will be exemplified as (a-2).

In the present specification, "(meth)acrylate" indicates either or both of acrylate and methacrylate, and thus "(meth) acryloyl" is used to indicate either or both of acryloyl or methacryloyl.

[Monofunctional Acrylic Monomer Having Fused-Ring Hydrocarbon Group or Polycyclic Hydrocarbon Group (a-1)]

The monofunctional acrylic monomer having a fused-ring hydrocarbon group or a polycyclic hydrocarbon group (a-1) is not particularly limited, but is preferably a monofunctional acrylic monomer including an organic group of 7 to 50 carbon atoms having a fused-ring hydrocarbon group or a polycyclic hydrocarbon group, and more preferably a monofunctional acrylic monomer including an organic group of 7 to 30 carbon atoms having a fused-ring hydrocarbon group or a polycyclic hydrocarbon group.

"Monofunctional acrylic monomer" refers to a monomer having one (meth)acryloyl group in one molecule.

In addition, "fused-ring hydrocarbon group" refers to a hydrocarbon (composed of a carbon atom and a hydrogen atom) group that has two or more rings and has at least one carbon atom that configures a certain ring and also configures a different ring at the same time, and "polycyclic hydrocarbon group" refers to a hydrocarbon group that has two or more rings and has a certain ring and a different ring bonded by a single bond or an alkylene having 1 to 10 carbon atoms.

Furthermore, "the organic group of 7 to 50 carbon atoms having a fused-ring hydrocarbon group or a polycyclic hydrocarbon group" refers to, for example, a group including n repeating units other than a (meth)acryloyl group and $R^2$ in the compound represented by formula (1).

As the monomer (a-1), the compound represented by formula (1) is preferably used because cured products that have excellent heat resistance and excellent adhesion to substrates can be obtained or the like.

In formula (1), $R^2$ is a monovalent organic group of 4 to 30 carbon atoms having a fused-ring hydrocarbon group or a polycyclic hydrocarbon group, preferably a non-polar monovalent organic group of 4 to 30 carbon atoms having a fused-ring hydrocarbon group or a polycyclic hydrocarbon group, and more preferably a group represented by any one of formulae (2) to (5). In addition, $n_A$ is preferably 0 or 1.

In formulae (2) to (5), $R^3$ is preferably hydrogen. * is a bonding site and bonds to O— at the right terminal of formula (1).

As the monomer (a-1), at least one compound selected from the following compound group (I) or the like is preferable.

(I)

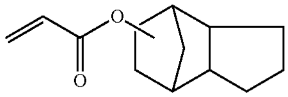

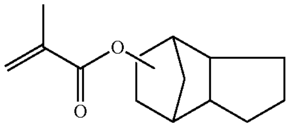

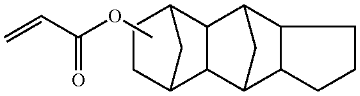

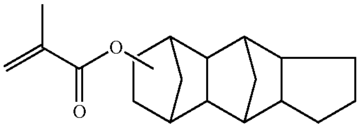

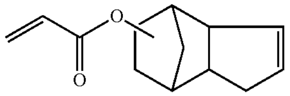

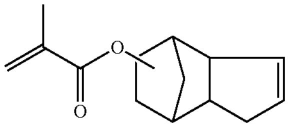

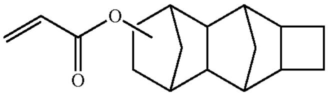

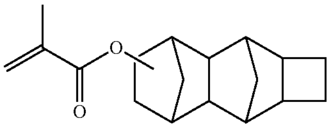

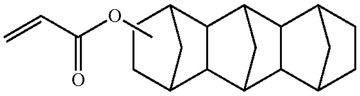

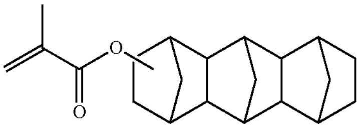

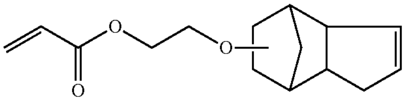

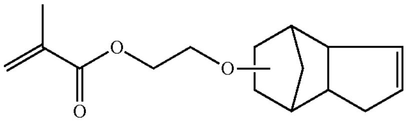

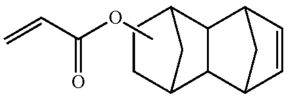

-continued

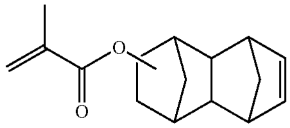

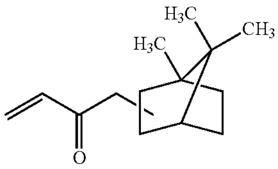

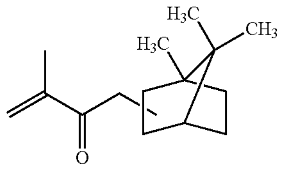

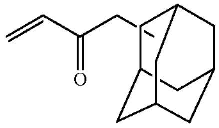

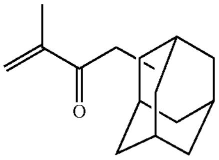

Among these, when the adhesion to substrates and heat resistance of cured products to be obtained are taken into account, the following compounds (11) to (20) are more preferred, and the compounds (11) and (17) are even more preferred.

(11)

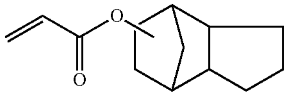

(12)

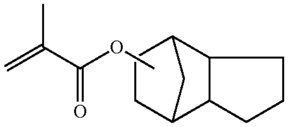

(13)

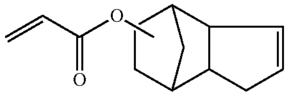

(14)

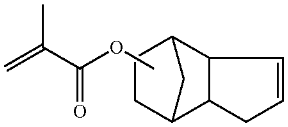

(15)

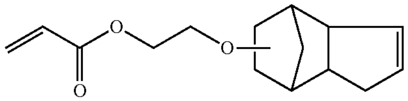

(16)

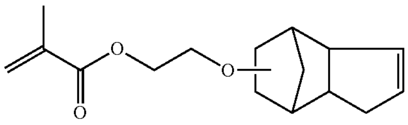

(17)

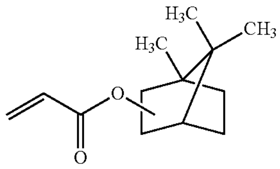

-continued (18)

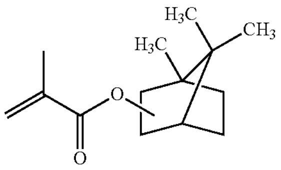

(19)

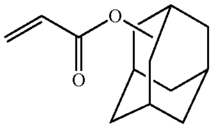

(20)

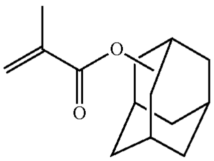

The monomer (a-1) may be one compound selected from the above-described compounds and the like or may be a mixture of two or more compounds shown above. A mixture of the compounds (11) and (17) is preferable, and, in the case of jointly using both, the weight ratio between the compound (11) and the compound (17) is preferably 5:10 to 10:5, more preferably 7:10 to 10:7 and still more preferably 9:10 to 10:9.

As the monomer (a-1), a compound produced by a well-known method may be used or commercially available products such as dicyclopentanyl acrylate (trade name; FANCRYL FA-513AS: Showa Denko Materials Co., Ltd.), dicyclopentanyl methacrylate (trade name; FANCRYL FA-513M: Showa Denko Materials Co., Ltd.), dicyclopentenyl acrylate (trade name; FANCRYL FA-511AS: Showa Denko Materials Co., Ltd.), dicyclopentenyl methacrylate (trade name; FANCRYL FA-511M: Showa Denko Materials Co., Ltd.), dicyclopentenyloxyethyl acrylate (trade name; FANCRYL FA-512AS: Showa Denko Materials Co., Ltd.), dicyclopentenyloxyethyl methacrylate (trade name; FANCRYL FA-512M: Showa Denko Materials Co., Ltd.), isobornyl acrylate (trade name; IB-XA: Kyoeisha Chemical Co., Ltd.), isobornyl methacrylate (trade name; IBXMA: Kyoeisha Chemical Co., Ltd.) and 1-adamantyl methacrylate (trade name; ADAMANTATE M-104: Idemitsu Kosan Co., Ltd.) may also be used.

[Monofunctional Polymerizable Monomer Having Monocyclic Hydrocarbon Group (a-2)]

"Monocyclic hydrocarbon group" refers to a hydrocarbon group having one ring (including an aromatic ring).

As the monomer (a-2), a compound produced by a well-known method may be used or commercially available products such as benzyl acrylate, cyclohexyl acrylate (trade name; V #155: Osaka Organic Chemical Industry Co., Ltd.) and cyclohexyl methacrylate (trade name; LIGHT ESTER CH: Kyoeisha Chemical Co., Ltd.) may also be used.

[Multifunctional Acrylic Monomer (B)]

The composition (X) contains the multifunctional acrylic monomer (B). "Multifunctional acrylic monomer" refers to a monomer having two or more (meth)acryloyl groups in one molecule. In the case of using the component (B), for example, 10 wt % to 50 wt % of the component (B) can be used relative to a total weight of 100 wt % of the composition (X).

Specific examples of the component (B) include tricyclodecane dimethanol di(meth)acrylate, bisphenol F ethylene oxide-modified di(meth)acrylate, bisphenol A ethylene oxide-modified di(meth)acrylate, isocyanurate ethylene oxide-modified di(meth)acrylate, polyethylene glycol di(meth)acrylate, polypropylene glycol di(meth)acrylate, pentaerythritol di(meth)acrylate, dipentaerythritol di(meth)acrylate, pentaerythritol di(meth)acrylate monostearate, trimethylolpropane di(meth)acrylate, 1,4-butanediol di(meth)acrylate, 1,6-hexanediol di(meth)acrylate, 1,9-nonanediol di(meth)acrylate, 1,4-cyclohexanedimethanol di(meth)acrylate, 2-n-butyl-2-ethyl-1,3-propanediol di(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, trimethylolpropane tri(meth)acrylate, ethylene oxide-modified trimethylolpropane tri(meth)acrylate, propylene oxide-modified trimethylolpropane tri(meth)acrylate, epichlorohydrin-modified trimethylolpropane tri(meth)acrylate, glycerin tri(meth)acrylate, ethylene oxide-modified glycerin tri(meth)acrylate, propylene oxide-modified glycerin tri (meth)acrylate, epichlorohydrin-modified glycerin tri(meth) acrylate, ditrimethylolpropane tetra(meth)acrylate, diglycerin tetra(meth)acrylate, caprolactone-modified dipentaerythritol hexa(meth)acrylate, ethylene oxide-modified phosphate tri(meth)acrylate, tris[(meth)acryloxyethyl] isocyanurate, caprolactone-modified tris[(meth)acryloxyethyl]isocyanurate, and compounds represented by formula (6).

From the viewpoint of improving the ion migration resistance of cured products that are formed of the photocurable composition (Z), $R^5$ in formula (6) is preferably a compound that is a group represented by any one of formulae (5) to (10) and more preferably a group represented by formula (7). In addition, np is preferably 0 or 1.

The component (B) may be one compound selected from the above-described compounds and the like or may be a mixture of two or more compounds described above.

The component (B) improves the photocurability of the composition (X). The component (B) is also suitable for forming cured products that have excellent heat resistance, excellent adhesion to substrates and the like in a balanced manner. From these viewpoints, the content of the component (B) relative to 100 wt % of the composition (X) is preferably from 10 wt % to 50 wt %, more preferably from 13 wt % to 30 wt %, and still more preferably from 15 wt % to 25 wt %.

[Radical Polymerizable Compound (C)]

From the viewpoint of improving the ion migration resistance and adhesion to a variety of substrates of cured products themselves of the composition (X), the hydroxyl value of the composition (X) is preferably adjusted to 1 to 100 mgKOH/g, and, in order for the adjustment, the radical polymerizable compound (C) that has a hydroxyl value of 100 to 300 mgKOH/g can be used. In the case of using the component (C), a part or all of the component (A) may be the component (C), a part or all of the component (B) may be the component (C) or the component (C) that is a radical polymerizable compound other than the component (A) and the component (B) may be contained. The component (C) may be used singly or as a mixture of two or more compounds.

In the case of using the component (C) that is a radical polymerizable compound other than the component (A) and the component (B), the component (C) functions as a hydroxyl value-adjusting agent, and, as the component (A)

or the component (B), a compound having a lower hydroxyl value than the compound (C) can be used or a compound having no hydroxyl group can also be used.

In this aspect, in the composition (X), for example, a monofunctional acrylic monomer having no hydroxyl group can be selected as the component (A) or a multifunctional acrylic monomer having no hydroxyl group can be selected as the component (B), and the hydroxyl value of the entire composition (X) is adjusted by blending a radical polymerizable compound that has a hydroxyl group as the component (C). In this case, from the viewpoint of forming cured products that have good ion migration resistance, the content of the component (C) relative to 100 wt % of the composition (X) is preferably from 0.1 wt % to 30 wt %, more preferably from 0.3 wt % to 25 wt %, and still more preferably from 0.5 wt % to 20 wt %.

In a case where the amount of the component (C) blended is within the above-described range, it becomes easy to adjust the hydroxyl value of the composition (X) to within a predetermined range. The hydroxyl value of the component (C) is preferably 100 to 300 mgKOH/g, and more preferably 150 to 200 mgKOH/g.

From the viewpoint of forming cured products that have good ion migration resistance, the component (C) preferably contains an acrylic oligomer. The weight average molecular weight of the component (C) is preferably 100 to 5,000, more preferably 300 to 3,000 and still more preferably 500 to 1,500. From the same viewpoint, the glass transition temperature (Tg) of the radical polymerizable compound (C) is preferably 85° C. or higher and more preferably 90° C. or higher.

[Photopolymerization Initiator (D)]

The composition (X) may further contain a photopolymerization initiator (D).

As the photopolymerization initiator, it is possible to use an ordinarily-used photopolymerization initiator as long as the photopolymerization initiator is a compound that is capable of initiating the polymerization of the monomer components in the composition (X) and generates a radical by irradiation with ultraviolet rays, visible light, electromagnetic waves or the like. Specific examples of the photopolymerization initiator include benzophenone, Michler's ketone, 4,4'-bis(diethylamino)benzophenone, xanthone, thioxanthone, isopropylxanthone, 2,4-diethylthioxanthone, 2-ethylanthraquinone, acetophenone, 2-hydroxy-2-methylpropiophenone, 2-hydroxy-2-methyl-4'-isopropylpropiophenone, 1-hydroxycyclohexylphenyl ketone, isopropylbenzoin ether, isobutylbenzoin ether, 2,2-diethoxyacetophenone, 2,2-dimethoxy-2-phenylacetophenone, 1,1'-(methylene-di-4,1-phenylene)bis (2-hydroxy-2-methyl-1-propanone), camphorquinone, benzanthrone, 2-methyl-1-[4-(methylthio)phenyl]-2-morpholinopropan-1-one, 2-(4-methylbenzyl)-2-(dimethylamino)-1-(4-morpholinophenyl) butan-1-one, 2-benzyl-2-dimethylamino-1-(4-morpholinophenyl)-butanone-1,4-dimethylaminobenzoate ethyl, 4-dimethylaminobenzoate isoamyl, 4,4'-di(tert-butylperoxycarbonyl)benzophenone, 3,4,4'-tri (tert-butylperoxycarbonyl)benzophenone, 2,4,6-trimethylbenzoyldiphenylphosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl)benzoxazole, 2-(p-dimethylaminostyryl)benzthiazole, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl) carbazole, 3,6-bis (2-methyl-2-morpholinopropionyl)-9-n-dodecylcarbazole, bis(n5-2,4-cyclopentadien-1-yl)-bis(2,6-difluoro-3-(1H-pyrrol-1-yl)-phenyl)titanium, 3,3',4,4'-tetra(tert-butylperoxycarbonyl)benzophenone, 3,3',4,4'-tetra(tert-hexylperoxycarbonyl)benzophenone, 3,3'-di(methoxycarbonyl)-4,4'-di(tert-butylperoxycarbonyl)benzophenone, 3,4'-di (methoxycarbonyl)-4,3'-di(tert-butylperoxycarbonyl) benzophenone, 4,4'-di(methoxycarbonyl)-3,3'-di(tert-butylperoxycarbonyl)benzophenone and the like. Examples of commercially available products include product names: Irgacure 379EG, Irgacure 127 and Irgacure 184, which are manufactured by BASF, product names: Omnirad 379EG, Omnirad 127 and Omnirad 184, which are manufactured by IGM Resins, and the like. Among these, 2-(4-methylbenzyl)-2-(dimethylamino)-1-(4-morpholinophenyl) butan-1-one is preferable.

From the viewpoint of forming cured products with good ion migration resistance, the content of the photopolymerization initiator (D) relative to 100 wt % of the composition (X) is preferably 5 to 15 wt % and more preferably 7 to 12 wt %. The photopolymerization initiator (D) may be a compound or a mixture of two or more compounds.

[Ion Scavenger (Y)]

In this invention, an ion scavenger (Y) is further added to the composition (X) to produce the photocurable composition (Z). The ion scavenger (Y) that is added to and used in the composition (X) has at least one selected from the group consisting of zirconium (Zr), bismuth (Bi), magnesium (Mg) and aluminum (Al). "Ion scavenger" is an agent capable of scavenging ions, and is not particularly limited as long as the agent has a function of scavenging at least one of cations and anions. Ions that are scavenged in this invention are ions that are incorporated in the photocurable composition (Z) reacted by irradiation with light, electron beams or the like to change its solubility in a solvent, for example, a sodium ion ($Na^+$), a chlorine ion ($Cl^-$), a bromine ion ($Br^-$) and copper ions ($Cu^+$ and $Cu^{2+}$). After these ions are scavenged, an electrical insulating property and electrolytic corrosion resistance are improved.

Examples of the ion scavenger that scavenges such ions include a cation scavenger that scavenges cations, an anion scavenger that scavenges anions, and an amphoteric scavenger that scavenges cations and anions.

(Cation Scavenger)

Examples of the cation scavenger that scavenges cations include inorganic ion exchangers such as metal oxides such as zirconium phosphate, zirconium tungstate, zirconium molybdate, zirconium antimonate, zirconium selenate, zirconium tellurate, zirconium silicate, zirconium phosphosilicate and zirconium polyphosphate. In addition, as this cation scavenger (also can be referred to as "inorganic ion exchanger"), it is possible to use IXE-100 (Zr-containing compound), IXE-150 (Zr-containing compound, which are put on the market by Toagosei Co., Ltd., and the like.

(Anion Scavenger)

Examples of the anion scavenger that scavenges anions include inorganic ion exchangers such as a bismuth oxide hydrate and hydrotalcites. In addition, as this anion scavenger (also can be referred to as "inorganic ion exchanger"), it is possible to use IXE-500 (Bi-containing compound), IXE-530 (Bi-containing compound), IXE-550 (Bi-containing compound), IXE-700 (Mg and Al-containing compound), IXE-700F (Mg and Al-containing compound), IXE-770D (Mg and Al-containing compound), IXE-702 (Al-containing compound), IXE-800 (Zr-containing compound), which are put on the market by Toagosei Co., Ltd., and the like.

(Amphoteric Scavenger)

Examples of the amphoteric scavenger that scavenges cations and anions include inorganic ion exchangers such as hydrous metal oxides such as an aluminum oxide hydrate and a zirconium oxide hydrate. In addition, as this amphoteric scavenger (also can be called "inorganic ion exchanger"), it is also possible to use IXE-1320 (Mg and Al-containing compound), IXE-600 (Bi-containing compound), IXE-633 (Bi-containing compound), IXE-680 (Bi-containing compound), IXE-6107 (Zr and Bi-containing compound), IXE-6136 (Zr and Bi-containing compound), IXEPLAS-A1 (Zr, Mg and Al-containing compound), IXEPLAS-A2 (Zr, Mg and Al-containing compound) and IXEPLAS-B1 (Zr and Bi-containing compound), which are put on the market by Toagosei Co., Ltd.

In this invention, as the (Y) component, the above-described cation scavengers, anion scavengers and amphoteric scavengers can be used singly or a plurality of the scavengers can be used in combination. It is preferable to use the amphoteric scavenger, which functions singly, in consideration of the fact that the amphoteric scavenger scavenges cations and anions such as $Na^+$, $Cl^-$, $Br^-$, $Cr^+$ and $Cu^{2+}$ at the same time.

From the viewpoint of improving an electrical insulating property and electrolytic corrosion resistance, the amount of the ion scavenger (Y) added relative to 100 parts by weight of the composition (X) is preferably from 0.1 part by weight to 10 parts by weight, more preferably from 0.1 part by weight to 5 parts by weight and still more preferably from 0.5 part by weight to 2 parts by weight.

For the purpose of improving the dispersibility of the ion scavenger (Y), a dispersant may be added to and used in the composition (X). A dispersant that can be used is not particularly limited and can be selected as appropriate in consideration of the dispersibility of the ion scavenger (Y) or the adhesion to plates of the photocurable composition (Z).

In the case of being added, the amount of the dispersant added is preferably from 0.1 part by weight to 100 parts by weight and more preferably from 0.1 part by weight to 50 parts by weight when the weight of the ion scavenger (Y) is set to 100 parts by weight. The amount of the dispersant added is preferably 0.1 part by weight from the viewpoint of sufficiently dispersing the ion scavenger (Y) and improving printability and is preferably 100 parts by weight or less from the viewpoint of sufficiently exhibiting the ion-scavenging function of the ion scavenger (Y).

[Inkjet Ink Composition and Active Energy Ray-Curable Ink Composition]

In a case where the photocurable composition (Z) of this invention is used as an inkjet ink composition, from the viewpoint of improving the ejectability, the viscosity at 25° C. is preferably 1 to 150 mPa·s and more preferably 3 to 70 mPa·s.

This invention can also be carried out as an inkjet ink composition containing the photocurable composition (Z) of this invention and an active energy ray-curable ink composition containing the inkjet ink composition. Here, the active energy ray refers to an energy ray capable of decomposing a compound that generates active species to generate active species. Examples of such an active energy ray include light energy rays such as visible light, an ultraviolet ray, an infrared ray, an X-ray, an x-ray, a β-ray, a y-ray and an electron beam.

In order to improve a variety of characteristics, the photocurable composition (Z) of this invention may contain other components such as a flame retardant, a resin containing a phenolic hydroxyl group, a melamine resin, an epoxy compound, an oxetane compound, a curing agent, a surfactant, a coloring agent, a polymerization inhibitor and a solvent to an extent that the effects of this invention are not impaired.

[Cured Product]

A cured product of this invention can be obtained by photocuring the photocurable composition (Z) of this invention.

In a case where the photocurable composition (Z) of this invention is used as an inkjet ink composition, a cured product can be produced by a method including the following step 1 and step 2.

(Step 1) A step of applying the photocurable composition (Z) of this invention onto a substrate by an inkjet method to form a film (Step 2) A step of irradiating the film obtained in the step 1 with light to cure the film and forming a cured product on the substrate The inkjet method is not particularly limited, and a well-known inkjet method can be used. The substrate is not particularly limited as long as the substrate can be a subject to which an ink of this invention is applied, and the shape of the substrate is not limited to a flat shape and may be a curved shape or the like.

In addition, the substrate is not particularly limited, and examples thereof include polyester-based resin substrates composed of polyethylene terephthalate (PET), polybutylene terephthalate (PBT) or the like; polyolefin resin substrates composed of polyethylene, polypropylene or the like; organic polymer films composed of polyvinyl chloride, a fluororesin, an acrylic resin, a polyamide, a polycarbonate, a polyimide or the like; cellophane; metal foils; laminate films of a polyimide and a metal foil; glassine, parchment paper and paper sealed with polyethylene, a clay binder, polyvinyl alcohol, starch, carboxymethyl cellulose (CMC) or the like that each have a sealing effect; silicon substrates; and glass substrates.

The use of the inkjet method makes it possible to easily apply the ink of this invention in a predetermined pattern and makes it possible to form a uniform pattern on a large substrate.

The temperature of the ink at the time of being ejected in an inkjet application device is preferably 10° C. to 120° C. The viscosity of the ink of this invention at the temperature is preferably 1 to 30 mPa·s, more preferably 2 to 25 mPa·s and still more preferably 3 to 20 mPa·s.

In the case of using an ink having a viscosity at 25° C. of more than 30 mPa·s, the viscosity of the ink during ejection is decreased by heating an inkjet head, which enables more stable ejection. In the case of jetting the ink by heating the inkjet head, the heating temperature is preferably 40° C. to 120° C. In the case of heating the inkjet head, it is preferable to use an ink containing no solvents.

The thickness of the film that is obtained may be selected as appropriate depending on a desired use and is preferably 1 to 20 μm and more preferably 5 to 15 μm.

In the case of irradiating the film with ultraviolet rays, visible light or the like, the exposure during irradiation needs to be adjusted as appropriate depending on the composition of the photocurable composition (Z) of this invention, and, in the case of being measured using a UV monitor manufactured by Opsytec Dr. Groebel GmbH ("UV-Pad", wavelength: UV-A (315 to 400 nm)), the exposure is preferably approximately 100 to 10,000 J/$cm^2$, more preferably approximately 150 to 5,000 J/$cm^2$, still more preferably approximately 180 to 3,000 J/$cm^2$ and particularly preferably approximately 200 to 2,000 J/$cm^2$. In addition, the wavelength of the ultraviolet rays, visible light or the like during irradiation is preferably 200 to 500 nm and more preferably 300 to 450 nm.

An exposure device may be used at the time of irradiating the film with light, and the exposure device is preferably a device that is equipped with an UV-LED lamp, a high-pressure mercury lamp, an ultrahigh-pressure mercury lamp, a metal halide lamp, a halogen lamp, a black-light lamp or the like and irradiates films with ultraviolet rays, visible light or the like within a range of 200 to 500 nm.

In addition, if necessary, the cured product cured by the irradiation with light may be further heated and fired. Normally, when heated and fired at 80° C. to 250° C. for 10 to 60 minutes, the cured product can become a stronger cured product.

The thickness of the cured product of this invention may be selected as appropriate depending on a desired use and is preferably 1 to 20 μm and more preferably 5 to 15 μm.

From the viewpoint of manufacturing highly reliable electronic circuit boards or the like, the glass transition temperature of the cured product of this invention measured with DMS6000 (Hitachi High-Tech Corporation) is preferably 85° C. or higher and more preferably 90° C. to 150° C. As a reliability test of electronic circuit boards, there are cases where a voltage-applied insulation resistance test under a constant temperature and humidity environment (hereinafter, defined as the ion migration resistance test) is carried out. In the ion migration resistance test, a specific voltage is applied in a specific constant temperature and humidity environment for a predetermined time, and the presence or absence of abnormality in the resistance value at that time is checked. The reliability is often evaluated at, particularly, high temperatures of 85° C. to 130° C., and thus the glass transition temperature of the cured product is desirably within the above-described range in order to obtain highly reliable electronic circuit boards and the like.

The cured product of this invention is a cured product that is excellent in terms of heat resistance, adhesion to plates and ion migration resistance and thus can be suitably used as a protective film or an insulating film in display elements such as a liquid crystal display element or an EL display element or electronic circuit boards such as a printed wiring board, a flexible wiring board, a semiconductor package substrate and a solar cell substrate.

Furthermore, the cured product of this invention can be suitably used as a coverlay film, a solder resistor or the like that protects conductors, such as a metal wire and an electrode, that form a predetermined circuit pattern.

[Electronic Component]

It is preferable that an electronic component of this invention includes the cured product of this invention and is manufactured by the method including the step 1 and the step 2. Because the cured product of this invention is excellent in terms of heat resistance, adhesion to plates, ion migration resistance and the like, the electronic component of this invention becomes an electronic component that is excellent in terms of electric characteristics, long-term reliability and the like.

EXAMPLES

Hereinafter, this invention will be more specifically described based on examples, but this invention is not limited to these examples.

In the examples and comparative examples, the following components were used. Each component will be denoted using an abbreviation shown below as appropriate.

[Monofunctional Acrylic Monomer (A)]

FA-513AS; dicyclopentanyl acrylate (trade name: FANCRYL FA-513AS, Showa Denko Materials Co., Ltd., hydroxyl value: 0 mgKOH/g, glass transition temperature (Tg) of homopolymer: 120° C.)

FA-513M; dicyclopentanyl methacrylate (trade name: FANCRYL FA-513M, Showa Denko Materials Co., Ltd., hydroxyl value: 0 mgKOH/g, glass transition temperature (Tg) of homopolymer: 175° C.)

IB-XA; isobornyl acrylate (trade name: IB-XA, Kyoeisha Chemical Co., Ltd., hydroxyl value: 0 mgKOH/g, Tg: 97° C.)

CHMA; cyclohexyl methacrylate (trade name: CH, Kyoeisha Chemical Co., Ltd., hydroxyl value: 0 mgKOH/g, Tg: 65° C.)

[Multifunctional Acrylic Monomer (B)]

IRR214-K; tricyclodecanedimethanol diacrylate (hydroxyl value: 0 mgKOH/g, Tg: 190° C.)

[Radical Polymerizable Compound (C)]

OT-2503; acrylic oligomer (ARONIX OT-2503; trade name, Toagosei Co., Ltd., weight average molecular weight: 1,000, hydroxyl value: 172 mgKOH/g, Tg: 94° C.)

[Photopolymerization Initiator (D)]

Irg379; 2-(4-methylbenzyl)-2-(dimethylamino)-1-(4-morpholinophenyl) butan-1-one (IRGACURE 379; trade name, BASF Japan Ltd.)

[Ion Scavenger (Y)]

IXEPLAS-A1; amphoteric ion scavenger (trade name; IXEPLAS-A1, Toagosei Co., Ltd., Zr, Mg and Al-containing compound)

IXEPLAS-A2; amphoteric ion scavenger (trade name; IXEPLAS-A2, Toagosei Co., Ltd., Zr, Mg and Al-containing compound)

Example 1

<Preparation of Composition 1>

Components (A), (B), (C), (D) and (Y) described below were mixed and dissolved to obtain a composition 1.

(A) FA-513AS 26 g
(A) FA-513M 6 g
(A) IB-XA 40 g
(A) CHMA 6 g
(B) IRR214-K 20 g
(C) OT-2503 12 g
(D) Irg379 12 g
(Y) IXEPLAS-A1 2.4 g <Production of Substrate 1>

An opposed gang-type electrode-patterned substrate (manufactured by Connectec Japan, L/S=approximately 30 μm/40 μm) was spin-coated with the composition 1 at a rotation speed of 620 rpm. After that, the composition 1 was irradiated with ultraviolet rays having a wavelength of 365 nm at an UV exposure (measured with a UV monitor manufactured by Opsytec Dr. Groebel GmbH ("UV-Pad"), wavelength: UV-A (315 to 400 nm)) of 5,000 mJ/$cm^2$ using a UV-LED irradiation and transport device "LSS-08A" (manufactured by Sun Energy Corporation, lamp wavelength: 365 nm) to photocure the composition 1, and the composition 1 was heated and fired at 200° C. for 60 minutes with a clean oven DT-610 (manufactured by Yamato Scientific Co., Ltd.), thereby obtaining a substrate 1 on which a 16 μm-thick cured product was formed. The film thickness of the cured product on the opposed gang-type electrode was measured and obtained with a laser microscope VK-X100 (manufactured by Keyence Corporation).

Examples 2 to 4 and Comparative Example 1

Each component of Example 1 was changed to a component shown in Table 1, and compositions 2 to 5 were produced by the same method as in Example 1. Substrates 2 to 5 were produced by the same method as in Example 1 using the obtained compositions 2 to 5.

(Ion Migration Resistance Test)

For the substrates (1 to 5) obtained above, ion migration resistance (IMG resistance) was evaluated by the following method.

The obtained substrate and an ion migration resistance tester MIG-87 (manufactured by IMV Corporation) were connected to each other with a wire and installed in a highly accelerated stress test system EHS-411 (manufactured by Espec Corp.), and then a 100 V DC current was applied to the opposed gang-type electrode pattern in a 130° C.×100% environment for 96 hours.

(Evaluation Standards)

IMG resistance: Resistance value of opposed gang-type electrode pattern after 96 hours O: The resistance value reads $1\times10^6\Omega$ or more.

X: The resistance value reads less than $1\times10^6\Omega$.

Discoloration of electrode: The occurrence of discoloration of the electrode after 96 hours was observed with the laser microscope VK-X100 (made by Keyence Corporation).

O: Discoloration of the electrode did not occur.

X: The electrode discolored.

Tg of the cured product was calculated from the Fox equation based on the weight ratio of each component. The hydroxyl value of the composition (X) was calculated based on the hydroxyl value of each component. In addition, as the viscosity of the photocurable composition (Z), the viscosity at 25° C. was measured using an E-type viscometer (TV-22 from Toki Sangyo Co., Ltd., which will be the same below).

TABLE 1

| | | Example 1 Composition 1 Substrate 1 | Example 2 Composition 2 Substrate 2 | Example 3 Composition 3 Substrate 3 | Example 4 Composition 4 Substrate 4 | Comparative Example 1 Composition 5 Substrate 5 |
|---|---|---|---|---|---|---|
| (A) | FA-513AS | 26 | 26 | 26 | 26 | 26 |
| | FA-513M | 6 | 6 | 6 | 6 | 6 |
| | IB-XA | 40 | 40 | 40 | 40 | 40 |
| | CHMA | 6 | 6 | 6 | 6 | 6 |
| (B) | IRR214-K | 20 | 20 | 20 | 20 | 20 |
| (C) | OT-2503 | 12 | 12 | 12 | 12 | 12 |
| (D) | Irg 379 | 12 | 12 | 12 | 12 | 12 |
| (Y) | IXEPLAS-A1 | 2.4 | | | | |
| | IXEPLAS-A2 | | 2.4 | 1.2 | 0.6 | |
| (X) | Hydroxyl value | 19 | 19 | 19 | 19 | 19 |
| (Z) | Viscosity | 34 | 35 | 34 | 33 | 32 |
| Cured product | Tg | 144 | 144 | 144 | 144 | 144 |
| | IMG resistance | ○ | ○ | ○ | ○ | X |
| | Electrode discoloration | ○ | ○ | ○ | ○ | X |

As shown in Table 1, the containing of the ion scavenger (Y) improved the ion migration resistance (hereinafter, referred to as "IMG resistance" as appropriate) of the cured products in a temperature range of 100° C. or higher. From this result, it can be said that, for improving the IMG resistance, it is effective for the ion scavenger (Y) to scavenge ions that degrade the IMG resistance. The fact that the IMG resistance was poor in Comparative Example 1 where the ion scavenger (Y) was not contained indicates that failure of scavenging ions that degraded the IMG resistance was one reason.

INDUSTRIAL APPLICABILITY

The photocurable composition of this invention is capable of forming a cured product that has good reliability in a high temperature constant-humidity environment, especially good ion migration resistance in a temperature range of 100° C. or higher and thus can be suitably used to manufacture, for example, display elements or electronic circuit boards such as a printed wiring board, a flexible wiring board, a semiconductor package substrate and a solar cell substrate.

The invention claimed is:

1. A photocurable composition (Z), obtained by adding an ion scavenger (Y) to a composition (X) containing a monofunctional acrylic monomer (A) and a multifunctional acrylic monomer (B), wherein a content of the monofunctional acrylic monomer (A) relative to 100 wt % of the composition (X) is from 40 wt % to 80 wt %, a content of the multifunctional acrylic monomer (B) relative to 100 wt % of the composition (X) is from 10 wt % to 50 wt %, and the composition (X) has a hydroxyl value of 1 mgKOH/g to 100 mgKOH/g.

2. The photocurable composition (Z) according to claim 1, wherein an addition amount of the ion scavenger (Y) relative to 100 parts by weight of the composition (X) is from 0.1 part by weight to 10 parts by weight.

3. The photocurable composition (Z) according to claim 1, wherein the ion scavenger (Y) is inorganic particles.

4. The photocurable composition (Z) according to claim 1, wherein the ion scavenger (Y) is inorganic particles that contain any of a zirconium compound, a magnesium compound and an aluminum compound.

5. The photocurable composition (Z) according to claim 1, wherein the ion scavenger (Y) is a mixture of a zirconium compound, a magnesium compound and an aluminum compound.

6. The photocurable composition (Z) according to claim 1, further comprising: a radical polymerizable compound (C) having a hydroxyl value of 100 mgKOH/g to 300 mgKOH/g in the composition (X).

7. The photocurable composition (Z) according to claim 6, wherein the radical polymerizable compound (C) has a weight average molecular weight of 100 to 5000.

8. The photocurable composition (Z) according to claim 6, wherein a content of the radical polymerizable compound (C) relative to 100 wt % of the composition (X) is from 0.1 wt % to 30 wt %.

9. The photocurable composition (Z) according to claim 6, wherein the radical polymerizable compound (C) has a hydroxyl value of 150 to 200 mgKOH/g.

10. The photocurable composition (Z) according to claim 6, wherein the radical polymerizable compound (C) is an acrylic oligomer.

11. The photocurable composition (Z) according to claim 1, wherein the monofunctional acrylic monomer (A) comprises a (meth)acrylate having one or a plurality of groups out of the group consisting of a fused-ring hydrocarbon group, a polycyclic hydrocarbon group and a monocyclic hydrocarbon group.

12. The photocurable composition (Z) according to claim 11, wherein the monofunctional acrylic monomer (A) is represented by the following formula (1), and (1)

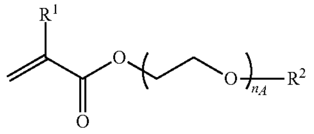

in formula (1), $R^1$ is hydrogen or methyl, $R^2$ is a monovalent organic group of 4 to 30 carbon atoms having a fused-ring hydrocarbon group, a polycyclic hydrocarbon group or a monocyclic hydrocarbon group, and $n_A$ is an integer of 0 to 10.

13. The photocurable composition (Z) according to claim 12, wherein $R^2$ in formula (1) is a group represented by any one of the following formulae (2) to (5), and (2)

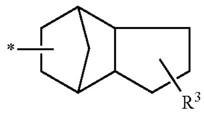

(3)

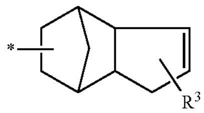

-continued (4)

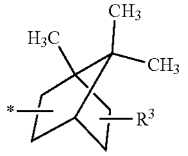

(5)

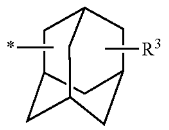

in formulae (2) to (5), each $R^3$ is independently hydrogen or an alkyl having 1 to 6 carbon atoms, and * is a bonding site.

14. The photocurable composition (Z) according to claim 1, wherein the multifunctional acrylic monomer (B) is a difunctional acrylic monomer represented by the following formula (6), and (6)

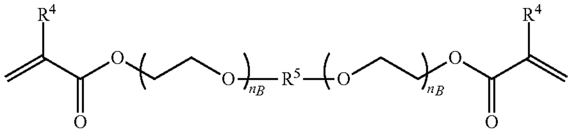

in formula (6), each $R^4$ is independently hydrogen or methyl, $R^5$ is a divalent organic group of 4 to 30 carbon atoms having a fused-ring hydrocarbon group, a polycyclic hydrocarbon group or a monocyclic hydrocarbon group, and each np is independently an integer of 0 to 10.

15. The photocurable composition (Z) according to claim 14, wherein $R^5$ in formula (6) is a group represented by any one of the following formulae (7) to (10), and (7)

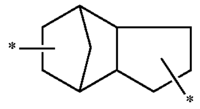

(8)

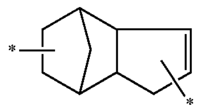

(9)

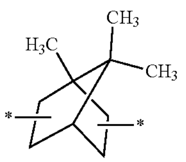

(10)

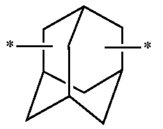

in formulae (7) to (10), * is a bonding site.

16. The photocurable composition (Z) according to claim 1, further comprising: 5 wt % to 15 wt % of a photopolymerization initiator (D) in 100 wt % of the composition (X).

17. The photocurable composition (Z) according to claim 1, of which a viscosity at 25° C. is 1 to 100 mPa·s.

18. The photocurable composition (Z) according to claim 1, wherein the composition (X) has a hydroxyl value of 5 mgKOH/g to 40 mgKOH/g.

19. An inkjet ink composition, comprising the photocurable composition (Z) according to claim 1.

20. An active energy ray-curable ink composition, comprising the inkjet ink composition according to claim 19.

21. A cured product, obtained by photocuring the photocurable composition (Z) according to claim 1.

22. A cured product, obtained by photocuring and then thermocuring the photocurable composition (Z) according to claim 1.

23. An electronic component, comprising the cured product according to claim 21.

24. An electronic component, comprising the cured product according to claim 22.

* * * * *